REINFORCEMENT OF CONCRETE STRUCTURES
Original Filed May 18, 1967 2 Sheets-Sheet 1
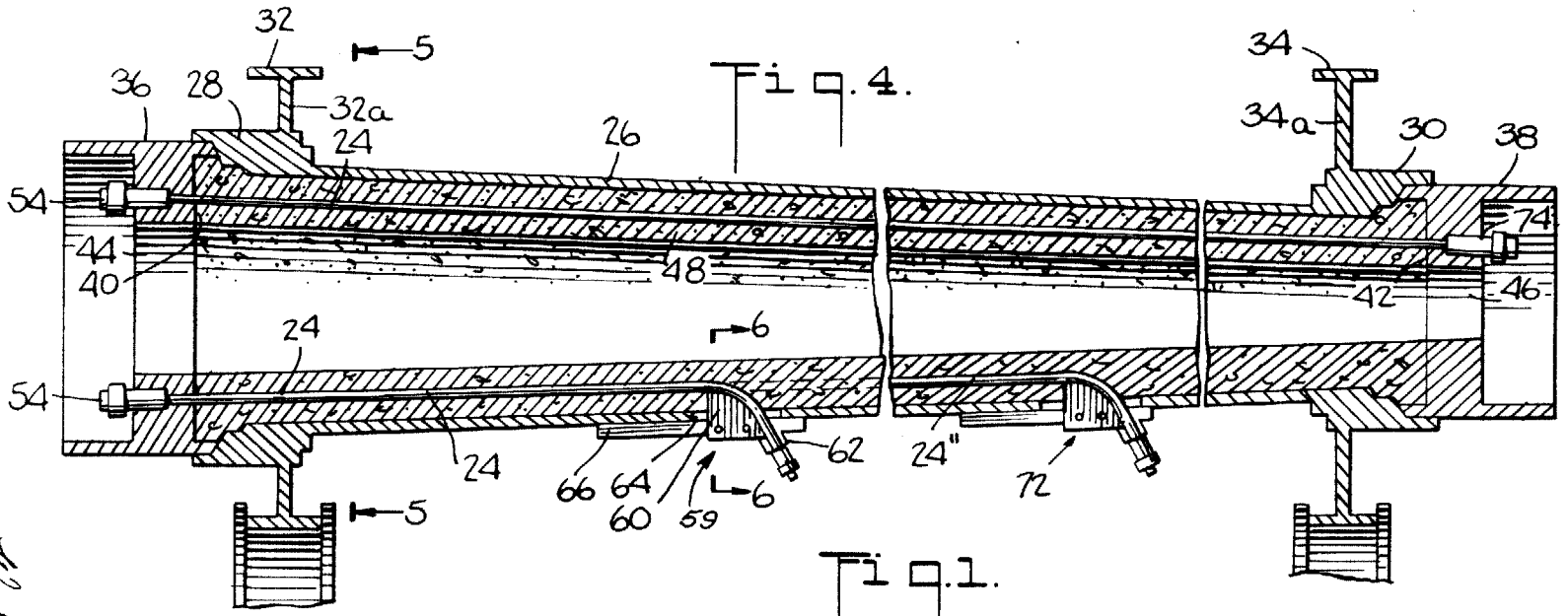
Fig. 4.
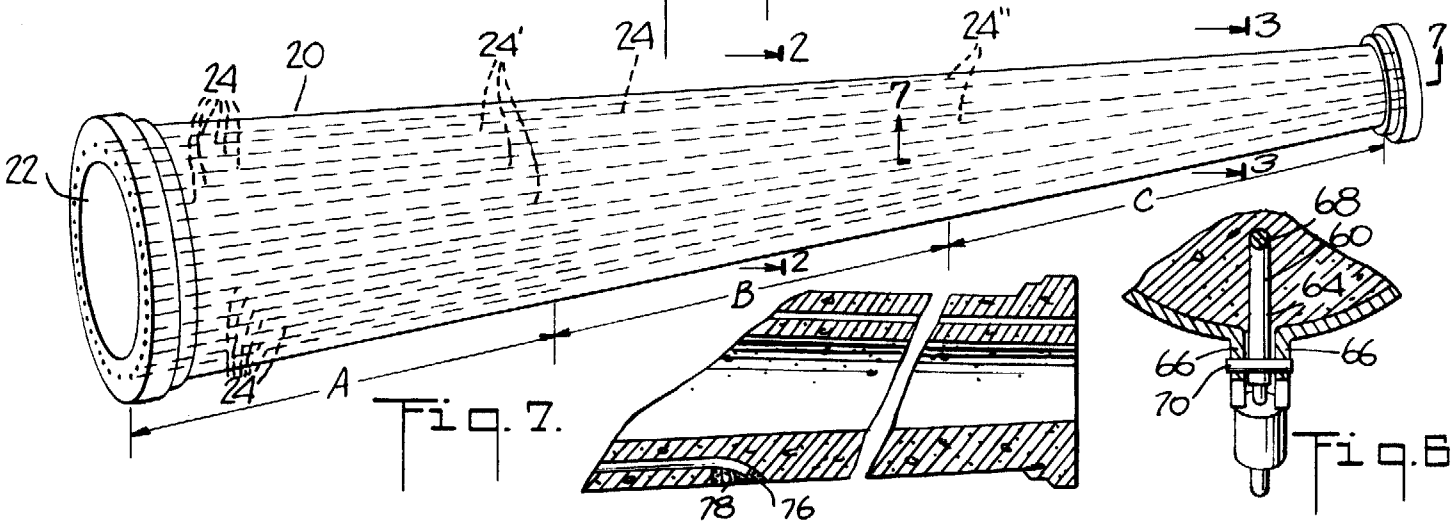
Fig. 1.
Fig. 8.
Fig. 7.
INVENTOR.
MYERS VAN BUREN
BY
Wood, Herron, McElhannon, Brooks & Litpatrick
ATTORNEYS

REINFORCEMENT OF CONCRETE STRUCTURES

Original Filed May 18, 1967 2 Sheets-Sheet 2

INVENTOR.
MYERS VAN BUREN
BY
Ward, Hasselton, McElhaney, Brooks & Littpatrick
ATTORNEYS United States Patent Office Re. 27,732
Reissued Aug. 14, 1973

27,732

REINFORCEMENT OF CONCRETE STRUCTURES

Myers Van Buren, Cheriton, Va., assignor to Bayshore Concrete Product Corp., Cape Charles Va.

Original No. 3,501,881, dated Mar. 24, 1970, Ser. No. 639,371, May 8, 1967. Application for reissue Feb. 22, 1971, Ser. No. 117,827
Int. Cl. E04c *3/10, 3/34;* F16l *9/04*
U.S. Cl. 52—223 3 Claims

Matter enclosed in heavy brackets [ ] appears in the original patent but forms no part of this reissue specification; matter printed in italics indicates the additions made by reissue.

ABSTRACT OF THE DISCLOSURE

Use of pretension elongated reinforcing rods in concrete structures, the rods being terminated at various intermediate ends of the structure, and special anchor arrangements for permitting intermediate termination of the rods.

This invention relates to the reinforcing of concrete, and more particularly it concerns the impartation of predetermined stresses at different locations along concrete structures.

The present invention is particularly useful in connection with the manufacture of concrete poles and columns for supporting high tension wires and the like. These poles and columns, in addition to their basic vertical supporting function, must also be capable of withstanding lateral bending loads imposed by the wires or cables which they support. Such bending loads however, impose tensile stresses on the concrete, and unless adequate provision is made for reinforcing, the concrete will fail. In general, such reinforcing is provided by means of elongated steel tension members embedded in the concrete and placed under a predetermined degree of tension. This imposes a compressive stress on the concrete which it easily withstands; and at the same time it serves to absorb nearly all its tensile stresses produced under lateral or bending loads.

Because of the high weight to strength ratio of concrete, it is desirable to taper elongated vertical support members made of concrete. This permits of a more efficient structure, since each cross sectional area may be tailored to the total weight being supported by it. As a result a uniform unit stress may be maintained throughout the structure.

The tapering of an elongated concrete structure however, presents certain problems with regard to the provision of reinforcement. This is because the elongated reinforcing rods which are embedded within the concrete are each subjected to a constant tensile stress throughout its length. Thus the total compressive force imposed by the reinforcing rods upon the concrete is the same at each cross sectional location along the structure. This uniform compressive force however is imposed upon different cross sectional areas; and toward the tip of the structure, where the cross sectional area is smallest, the unit compressive stresses become quite high in relation to those near the base of the structure.

Prior attempts to solve this problem and to obtain a more uniform unit stress throughout a tapered concrete structure have been unsatisfactory. According to one technique, the reinforcing members were selectively coated in various regions along their length to prevent their bonding to the concrete. Thus those reinforcing members which were not bonded in the chosen regions would not impose compressive stresses in these regions. This technique required an excessive amount of reinforcing material for the amount of useful reinforcing produced. Moreover, in those regions where the reinforcing material was not bonded to the concrete and was left unstressed, the concrete was actually in a weakened condition due to the presence of the internal passages through which the reinforcing material extended.

According to another prior technique, only a sufficient amount of prestressed reinforcing material is used to produce a desired amount of unit stress at the small end of the concrete structure. Then additional unstressed reinforcing is added to the larger end of the structure in order to strengthen it in that region. While this avoids the small end weakening problem of the first technique, it also requires uneconomical use of reinforcing material.

The present invention overcomes all of the above described problems of the prior art. The present invention makes possible the provision of a reinforced tapered concrete structure subjected to a substantially uniform compressive unit stress throughout its length. No problems of weakening are presented with the arrangements of the present invention; and maximum efficiency is obtained in the use of reinforcing material.

Essentially, the present invention makes use of various reinforcing members which are prestressed in tension and which are embedded within a continuous integral concrete structure. These reinforcing members are terminated at different locations within the concrete structure so that the unit stress at any cross section can be established by providing at such cross section a proper number of properly stressed reinforcing members.

According to a particular feature of the present invention a novel technique is provided for manufacturing concrete structures having various prestressed reinforcing members embedded at different locations therealong. According to the technique a concrete forming mold is prepared for forming the reinforced structure. Anchor members are mounted on the sides of the mold and extend inwardly a distance from the inner mold surface. Cables or other elongated reinforcing members are connected to the anchor members and are subjected to a predetermined tensile stress. Thereafter the concrete is poured into the mold and allowed to set. Upon completion of this set, the cables are disconnected from the anchor members, as by burning them off. The anchor members are then removed along with the mold and the voids left in the concrete structure by the anchor members are filled up with additional concrete.

According to a further feature of the invention there are provided novel anchor member arrangements involving anchor members which may be securely mounted to the sides of the mold for holding reinforcing members inside the mold under a high degree of tension, and which at the same time are capable of easy removal from the hardened concrete structure. These novel arrangements comprise special plates of generally triangular or quarter-round configuration which extend through a slot in the mold side and which are pinned in place to lugs or flanges formed adjacent the slot on the outer mold surface. The cable or other reinforcing member to be embedded in the finished structure is secured to the plate in such a manner that the plate holds the reinforcing member inside the mold while withstanding the tensile forces imposed on the reinforcing member. The securing arrangement however involves only a looping or abutment type interconnection between the plate and the reinforcing member so that the plate may easily be withdrawn out through the slot after the concrete has set while leaving the cable embedded in the concrete.

There has thus been outlined rather broadly the more important feature of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

Specific embodiments of the invention have been chosen for purposes of illustration and description, and are shown in the accompanying drawings, forming a part of the specification wherein:

FIG. 1 is a perspective view of a tapered hollow concrete supporting pole made according to the present invention;

FIG. 4 is a section view taken in side elevation of a mold arrangement for centrifugally casting the pole of FIG. 1;

FIG. 6 is a fragmentary section view taken along lines 6—6 of FIG. 4;

FIG. 7 is a fragmentary section view taken along lines 7—7 of FIG. 1;

FIG. 1 shows a centrifugally cast tapered concrete supporting pole 20 of circular cross section and formed with a hollow circular core 22. As shown in dotted outline, a plurality of elongated steel reinforcing rods or cables 24 are embedded within the concrete of the pole 20 and extend along its length. These reinforcing rods are prestressed; that is, they are subjected to a predetermined amount of tensile stress by external means during the time that the concrete which forms the pole 20 is hardening. Subsequent to hardening of the concrete, the rods 24 are released. As a consequence of this, these rods serve to induce compressive stresses along the length of the pole 20 thus increasing the ability of the pole to withstand tensile strains which are produced by forces tending to deflect or bend the pole in a lateral direction.

As stated above, the pole 20 is tapered from end to end. The purpose for this is to compensate for the high weight to strength ratio of the concrete, and to provide for a uniform unit supporting stress at each cross sectional location along its length. In this connection it will be noted that the loading at any location along the pole is made up of both the load being supported by the pole and the weight of the pole concrete above the location. Thus the total loading increases toward the bottom of the pole. This increase in total loading is compensated for by increasing the pole cross-section toward the bottom thereof, thus providing for a uniform compressive stress throughout its length.

In addition to the pole loading caused by the load it supports and the weight of the pole itself, the pole 20 is also subjected to loading equal to the sum of the tensile forces in the reinforcing rods 24. These rods, by virtue of their tensile stresses, produce an equal amount of compressive loading on the concrete. Now this reinforcing rod loading is continuous along the length of the rods. Consequently the variation in the pole cross section results in a variation in unit stress produced by the rods 24 at different cross-sectional locations along the pole.

Figure 2:
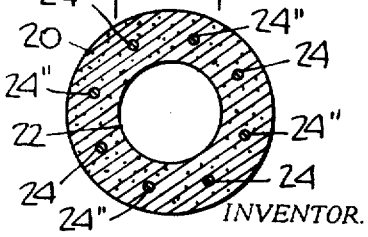
FIG. 2 is a section view taken along line 2—2 of FIG. 1.

According to the present invention, this is compensated for by providing a greater number of the reinforcing rods 24 where the cross-sectional area of the pole 20 is largest and a lesser number of cables where the cross-sectional area of the pole is smallest. Each of the cables is subjected to a continuous tensile stress along its length. However, certain of the cables are terminated intermediate the overall length of the pole 20. Thus, as can be seen in FIG. 1 the base section of the pole, illustrated by the distance A, is provided with the greatest number of reinforcing rods 24. A first portion of these rods however, (i.e. rods 24') are terminated at the upper end of the base section A. The remainder of the rods 24 continue up the length of the pole 20 through an intermediate section B. At the upper end of this section, a second portion (i.e. rods 24'') are terminated. The remainder of the rods 24 then continue on through an upper portion C of the pole 20 and terminate at its upper end. Thus, as shown at the lower end of the pole 20 in FIG. 1 there are provided a maximum number of reinforcing rods 24 which generate a greater total compressive force upon the concrete in the lower section A of the pole. This greater force is counteracted by the greater cross-sectional area in this region of the pole so that the unit stress is not exorbitantly high. Thereafter, as illustrated in FIG. 2, a smaller number of the reinforcing rods 24 extend through the intermediate section B. Each of these rods is subject to the same tensile stress that it experiences in the lower section A. However, the lesser number of these rods in the intermediate section B results in a smaller total compressive force exerted in this region of the pole 20. On the other hand, the total cross-sectional area of the pole 20 in the intermediate section B is less than it was in the lower section A so that the total unit stress produced by the reinforcing rods on the concrete in the intermediate region is approximately that produced in the lower section A.

Figure 3:
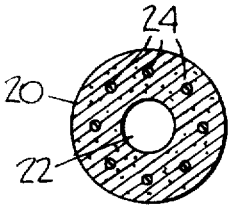
FIG. 3 is a section view taken along line 3—3 of FIG. 1.

Similarly as shown in FIG. 3 an even smaller number of the reinforcing rods 24 pass through the upper region C. Again, these rods are each subjected to the same tensile stress which they experienced in passing through the lower and intermediate sections A and B of the pole 20. Thus, the total compressive force exerted by them on the concrete in the upper section C is less than that exerted by the reinforcing rods in the lower and intermediate sections A and B. However, this compressive force is resisted in the upper section C by an even smaller concrete cross section. Therefore the unit stress in the upper section C again approximates that existing in the lower and intermediate sections A and B.

It will be noted that although the various groups 24' and 24'' of the rods 24 terminate at locations intermediate the ends of the pole 20, the pole 20 itself is of continuous integral construction and is formed as a unit at one time.

A centrifugal casting arrangement used to produce the pole 20 is shown in FIG. 4. This casting arrangement comprises a tapered cylindrical steel outer shell 26 having collars 28 and 30 formed at each end. These collars provide anchorage arrangements for running wheels 32 and 34 which extend around the mold 26 at each end thereof.

The wheels 32 and 34 are dimensioned so that the central axis of the shell 26 remains horizontal while the mold rotates. Thus, it will be seen that the wheel 32 has a shorter web 32a while the wheel 34 has a longer web 34a.

Lower and upper end plate members 36 and 38 are fitted into the collars 28 and 30 at the opposite ends of the shell 26 respectively. The end plate members 36 and 38 are provided with end walls 40 and 42, respectively, having central openings 44 and 46.

In order to form a concrete pole by means of the device shown in FIG. 4 wet concrete, shown at 48, is poured inside the shell 26 and the shell is thereupon caused to rotate rapidly about its longitudinal axis. As a result of the centrifugal forces produced by such rotation the wet concrete 48 distributes itself evenly about the inner surfaces of the shell 26. Any excess concrete will find its way out from the end openings 44 and 46. Thus, as illustrated in FIG. 4, the wet concrete 48 which remains within the mold 26 assumes the shape of the finished pole 20. The mold 26 continues in rotation until the concrete 48 has fully formed in this desired finished shape. Thereafter, the mold 26 is stopped and the concrete pole is withdrawn after hardening.

Figure 5:
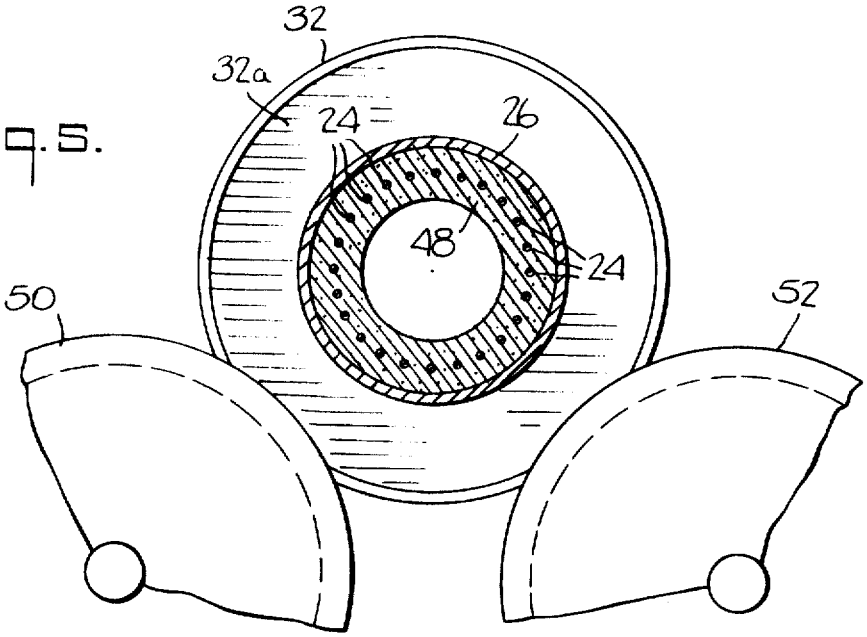
FIG. 5 is a section view taken along lines 5—5 of FIG. 1.

Turning now to FIG. 5 it will be seen that the wheels 32 and 34 each ride upon a driver wheel 50 and an idler wheel 52 which serve to ensure that the longitudinal axis of the mold 26 remains stationary during rotation.

As shown in FIG. 4, the reinforcing rods 24 may be affixed by means of anchors 54 into the lower end wall 40 before or after the concrete 48 is poured into the molds. The shorter rods 24' which terminate at the upper end of the lowermost section A are terminated at first intermediate anchors 59. To this end these rods are each caused to bend about an associated anchor plate 60 so that they protrude out through the side of the shell 26. The ends of these rods are held in place by means of anchor elements 62 mounted on the outer surface of the shell 26. As can be seen in FIGS. 4 and 6 there are provided longitudinal slots 64 in the side of the mold 26 at the upper end of the lower region A where the rods 24' terminate. A pair of outwardly protruding flange elements 66 are secured to the outer surface of the mold 26, and are positioned to lie along the opposite sides of each of the slots 64.

The anchor plates 60 are of generally triangular or quarter-round configuration and they extend through the slots 64 down into the interior of the shell 26. As shown in FIG. 6 the edge of each plate 60 is formed with a groove or recess 68 to hold one of the cables 24' securely while the cable passes around the edge of the plate 60 and out through the slot 64 to one of the anchor members 62. The plate 60 itself is secured in place by means of pins 70 which pass through the flanges 66 and the plate 60. The rods 24' can be pretensioned to any desired degree by adjustment of either the anchor member 54 at the lower end thereof or the anchor arrangement 62 at the upper end thereof.

Second intermediate cable termination arrangements 72 are provided at the upper end of the intermediate section B for terminating the rods 24" at the end of this section. The remaining rods 24, which extend the full length of the pole 20 through sections A, B and C are terminated in conventional fashion by means of anchors 74 arranged in the upper end wall 42.

After the various reinforcing rods 24 have been properly pretensioned and the assembly has been rotated until the concrete has formed, the mold 26 is stopped and subsequently the first and second intermediate anchor arrangements 59 and 72 are removed. This is achieved by releasing the upper anchors 62 and withdrawing the pins 70 from the anchor plates 60. Thereafter, the anchor plates are withdrawn out from the longitudinal slots 64 and the reinforcing rods 24' and 24" are severed as illustrated in FIG. 7 at locations 76 within the regions 78 voided by the anchor plates 60. The regions 78 are thereupon filled with additional concrete to provide a smooth even exterior for the pole 20. After the various intermediate anchor arrangements have thus been removed, the end anchor arrangement 54 and 74 are removed as are the end plates 36 and 38. The finished pole 20 is then removed from the outer shell 26.

Figure 8:
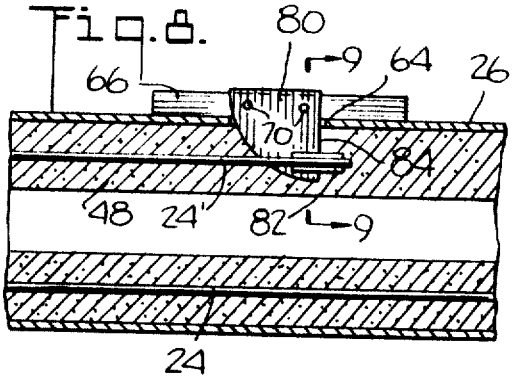
FIG. 8 is a fragmentary section view illustrating a modified reinforcing rod anchor arrangement according to the present invention.
Figure 9:
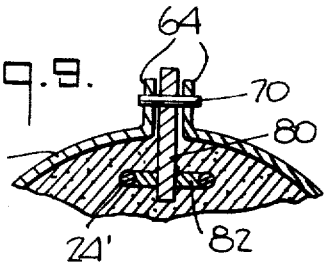
FIG. 9 is a section view taken along line 9—9 of FIG. 8.

FIGS. 8 and 9 show a modified version of the intermediate anchor assemblies 59 and 72 used in terminating the various cables 24' and 24". As shown in FIG. 8, the shell 26 is provided at each anchor point with a longitudinal slot 64 and associated side flanges 66. A modified anchor plate 80 or similar configuration to the anchor plate 60 of FIG. 6 is inserted into the slot 64 and is pinned in place as in the preceding arrangement. In the arrangement of FIGS. 8 and 9 however, the plate is reversed. That is, the curved or slanted edge of the plate which faced rearwardly in the preceding arrangement, faces forwardly in the present arrangement. Additionally, in the present arrangement the reinforcing rod 24' loops around a holding plate 82 which abuts a straight sided, non-slanting rearwardly facing surface 84 of the anchor plate 80. In this arrangement the pretension on the cable 24' or 24" must be provided by the anchor member 54 at the end of the mold arrangement for there is no adjustable anchor element provided in the intermediate anchor region.

Figure 11:
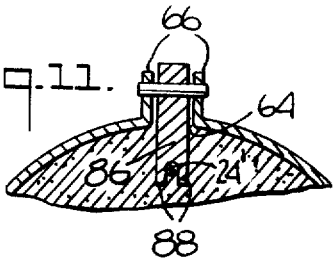
FIG. 11 is a section view taken along line 11—11 of FIG. 10.
Figure 10:
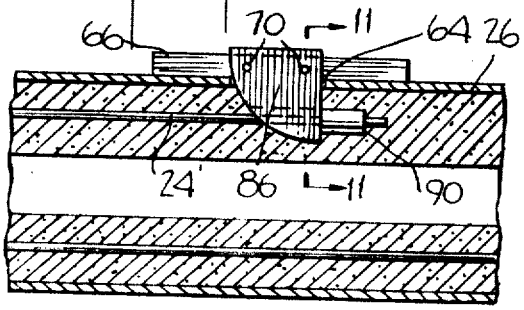
FIG. 10 is a view similar to FIG. 8 but showing a still further modification of the reinforcing rod anchor arrangement according to the present invention.

A further intermediate anchor arrangement is shown in FIGS. 10 and 11. Here again the mold 26 is provided with a longitudinally extending slot 64 surrounded on both sides by means of longitudinally extending flanges 66 which are welded or otherwise secured to the outer surface of the mold 26. A further anchor plate 86 extends down into slot 26 and is secured in place by means of the pins 70 which pass through the plate 86 and through the flanges 66. As shown in FIG. 11 the plates 86 are provided with a fork-like lower end 88 which straddles the reinforcing cable 24'. An anchor member 90, similar to the anchor members 54, 62 and 74, is provided to abut against a rearwardly facing surface 92 of the anchor plate 86 and to secure the end of the cable 24' in place until after the concrete within the shell 26 is fully hardened.

It will be noted that with the two anchor plate modifications shown in FIGS. 8–11 the reinforcing cables 24' and 24" are fully terminated within the shell 26 prior to the pouring of the concrete into the shell. Accordingly, it is not necessary when using these two modifications to burn or otherwise sever the reinforcing cables after the concrete has set.

It will be additionally noted that in all three of the anchor arrangements described there is provided a simple abutting relationship between the reinforcing cables 24' and 24" and the anchor plates 60, 80 and 86, so that the anchor plates may readily be removed from the slot 64 while leaving the reinforcing cable embedded properly in place.

Those skilled in the art will readily appreciate that while the reinforcing rods or cables shown in the illustrative embodiments only have one end terminated intermediate the ends of the finished structure, any or all of the rods or cables may also have their opposite ends terminated intermediate the ends of the structure. Thus, for example, where the structure is to be driven partway into the ground and will be subjected to lateral bending loads, the structure may be provided with additional reinforcement only in the vicinity of the ground level to counteract the large bending movements which exist in that region. This may be accomplished according to the present invention, by providing additional tensioned reinforcing rods or cables which are terminated at both ends just beyond the ground line and intermediate the ends of the overall structure.

Having thus described my invention with particular reference to the preferred forms thereof, it will be obvious to those skilled in the art to which the invention pertains, after understanding my invention, that various changes and modifications may be made therein without departing from the spirit and scope of my invention, as defined by the claims appended thereto.

What is claimed as new and desired to be secured by Letters Patent is:

1. A reinforced concrete load supporting structure comprising a *centrifugally cast* concrete column which extends vertically upwardly from a lower reigon to a higher region, said column being generally annular in cross-section with both the interior and exterior surfaces substantially uniformly tapered from said lower region throughout the length of the column to said higher region, the taper of said concrete column being such that the weight of concrete at any location between the regions in said column together with the external load forces acting at said location produce a predetermined stress distribution along said length of said column, and a plurality of reinforcing rods distributed around the wall of the column and completely embedded in and extending alone reinforcing rods distributed around the wall of the column and completely embedded in and extending along the tapered length of said column upwardly from said lower region toward said higher region, *each of said rods being spaced from the next adjacent rod,* each of said rods being bonded to said concrete under a predetermined degree of tension along its length to increase the compressive stresses within said column, and selected ends of certain ones of said reinforcing rods under tension terminating and completely embedded within the concrete of said column intermediate said higher and lower regions whereby control of said predetermined stress distribution is obtained along the length of said column.

2. A structure according to claim 1 wherein said rods are bonded throughout their length to the concrete in said column.

3. A reinforced concrete load supporting structure comprising a *centrifugally cast* concrete column which extends vertically upwardly from a lower region to a higher region, said column being generally annular in cross-section with both the interior and exterior surfaces substantially uniformly tapered from said lower region [thoughout] *throughout* the length of the column to said higher region, the taper of said concrete column being such that the weight of concrete at any location between the regions in said column together with the external load forces acting at said location produce a predetermined stress distribution along said length of said column, and a plurality of reinforcing rods distributed around the wall of the column and completely embedded in an extending along the tapered length of said column upwardly from said lower region toward said high region, *each of said rods being spaced from the next adjacent rod,* each of said rods being bonded to said concrete under a predetermined degree of tension along its length to increase the compressive stresses within said column, and selected ends of certain ones of said reinforcing rods under tension terminating within the concrete of said column [intermeditae] *intermediate* said higher and lower regions whereby control of said predetermined stress distribution is obtained along the length of said column.

References Cited

The following references, cited by the Examiner, are of record in the patented file of this patent or the original patent.

UNITED STATES PATENTS

| | | | |
|---|---|---|---|
| 890,373 | 6/1908 | Orr | 52—301 |
| 2,859,504 | 11/1958 | Crowley | 52—223 |
| 3,273,295 | 9/1966 | Amiriklan | 52—223 |
| 3,347,005 | 10/1967 | Preston | 52—230 |
| 893,640 | 7/1908 | Moccetti | 52—659 |
| 3,034,537 | 5/1962 | Seaman et al. | 52—224 |

FOREIGN PATENTS

| | | | |
|---|---|---|---|
| 1,066,387 | 4/1967 | Great Britain. | |
| 67,327 | 7/1948 | Denmark. | |
| 1,010,069 | 3/1952 | France | 52—223 |
| 1,108,398 | 8/1955 | France | 52—223 |

FRANK L. ABBOTT, Primary Examiner

J. L. RIDGILL, Jr., Assistant Examiner

U.S. Cl. X.R.

52—245, 723; 138—172, 175, 177

UNITED STATES PATENT OFFICE
CERTIFICATE OF CORRECTION

Patent No. Reissue No. 27,732 Dated August 14, 1973

Inventor(s) Myers Van Buren

It is certified that error appears in the above-identified patent and that said Letters Patent are hereby corrected as shown below:

Column 7, line 2, "reigon" should read -- region --; lines 12 and 13 should be cancelled. Column 8, line 4, "an extending" should read -- and extending --.

Signed and sealed this 12th day of February 1974.

(SEAL)
Attest:

EDWARD M.FLETCHER,JR.
Attesting Officer

C. MARSHALL DANN
Commissioner of Patents